June 1, 1954

L. E. SWEDLUND 2,680,204

GUN STRUCTURE

Filed Nov. 30, 1950

INVENTOR
Lloyd E. Swedlund
BY William A. Zalesak
ATTORNEY

Patented June 1, 1954

2,680,204

UNITED STATES PATENT OFFICE 2,680,204

GUN STRUCTURE

Lloyd Edward Swedlund, Lancaster, Pa., assignor to Radio Corporation of America, a corporation of Delaware Application November 30, 1950, Serial No. 198,261

8 Claims. (Cl. 313—76)

This invention is directed to an electron discharge device and more particularly to an improved cathode ray picture tube and its operation.

This invention relates to cathode ray picture tubes in which a beam of electrons is focused upon a fluorescent screen and scanned thereover to produce an illuminated raster. At the present time, such television picture tubes commonly use a magnetic focusing coil for bringing the electron beam to a sharply defined point at the fluorescent screen surface. Also, there is used a magnetic scanning system comprising pairs of coils positioned in alignment around the beam path to provide a pair of deflecting fields perpendicular to each other and to the normal beam path. With the increased development of picture tubes for television, poor focus of the beam cannot be tolerated. If optimum focus of the electron beam is to be maintained at all points of the fluorescent screen to which the beam is deflected, it is necessary that the electron beam be properly aligned with the center of both the focusing field and the deflecting fields. Only a small deviation from this desired alignment will produce a noticeable distortion of the beam focus at the fluorescent screen, particularly in tubes having a deflection angle of more than 50°. In tubes of this type, for example, if the electron beam does not enter substantially the center of the focusing field, the electron beam will tend to then pass through portions of the focusing field possessing noticeable aberration characteristics, which will distort the beam focus at the fluorescent screen. Furthermore, if the electron beam does not enter the deflection coil fields on their common axis, then one side of the focused picture will show more distortion than the other side, or the electron beam may even strike the tube neck when deflected to the edge of the screen. In tubes using a wide deflecting angle, such as that approximating 70° and more, these above factors are more important than in tubes using a smaller deflection angle, since poor focusing will be more noticeable at the edge of the screen.

This problem of accurate beam alignment is further complicated with electron guns incorporating ion trap structures therein. To eliminate negative ions from the beam, which cause deterioration of the phosphor screen, the electron beam may be either bent off of the tube axis and then realigned with the axis, or the beam may originate off the axis and then aligned therewith to pass through the center of the focusing and deflecting fields. With ion trap gun structures, it has proved difficult to provide both correct beam alignment and maximum useful beam current from the gun to provide maximum screen brightness. That is, when an ion trap magnetic field is used to align the beam with the axis, often part of the beam is blocked by gun structures, or, if the alignment field is adjusted to give maximum screen brightness the beam is not properly aligned with the focusing and deflecting fields.

It is therefore, an object of my invention to provide an electron picture tube having optimum relationship of the electron beam with the focusing and deflecting fields of the tube.

It is another object of my invention to minimize aberration effects of a focusing field produced on an electron beam within a picture tube.

It is a further object of my invention to provide a television picture tube using a wide deflecting angle and having a minimum distortion of the picture at the edge due to misalignment of the electron beam with the deflecting fields.

It is another object of my invention to provide means within a cathode ray tube for automatically centering the beam of the tube within the deflecting fields when the ion trap magnetic field is adjusted to produce maximum screen brightness.

It is a further object of my invention to provide a cathode ray tube structure to insure that when the beam is centered by adjusting for maximum screen brightness there is minimum displacement of the beam from the center of the tube neck.

My invention is directed to a cathode ray tube in which the electron gun structure used in the tube comprises an accelerating electrode formed by a metal tubular portion for aligning the electron beam with the tube axis. This accelerating electrode includes a limiting aperture through which the beam passes. In accordance with my invention, the limiting aperture is positioned accurately within the tube envelope so that it is coaxial with the tube axis, and also so that it is within the principal focusing field of the electron beam. This arrangement of parts is such that the electron beam emerging through the limiting aperture is automatically centered with the tube axis and with the center of the focusing field. Furthermore, by providing a relatively close fit between the tube envelope and the deflecting yoke, the deflecting coils within the yoke are also centered coaxially with the tube envelope and so that the electron beam enters the deflecting field substantially at their common axis.

This arrangement of structure is particularly advantageous in television picture tubes having wide angle deflection and also when using an ion trap gun, in which the electron beam is displaced from the tube axis and then realigned with the tube axis by a magnetic field. Often the re-alignment of the beam by the ion trap magnet is of a nature to cause the beam to be misaligned with relationship to the focusing fields and the deflecting fields.

The novel features which I believe to be characteristic of my invention are set forth with particularity in the appended claims, but the invention itself will best be understood by reference to the following description taken in connection with the accompanying drawing, in which:

Figures 1, 2:
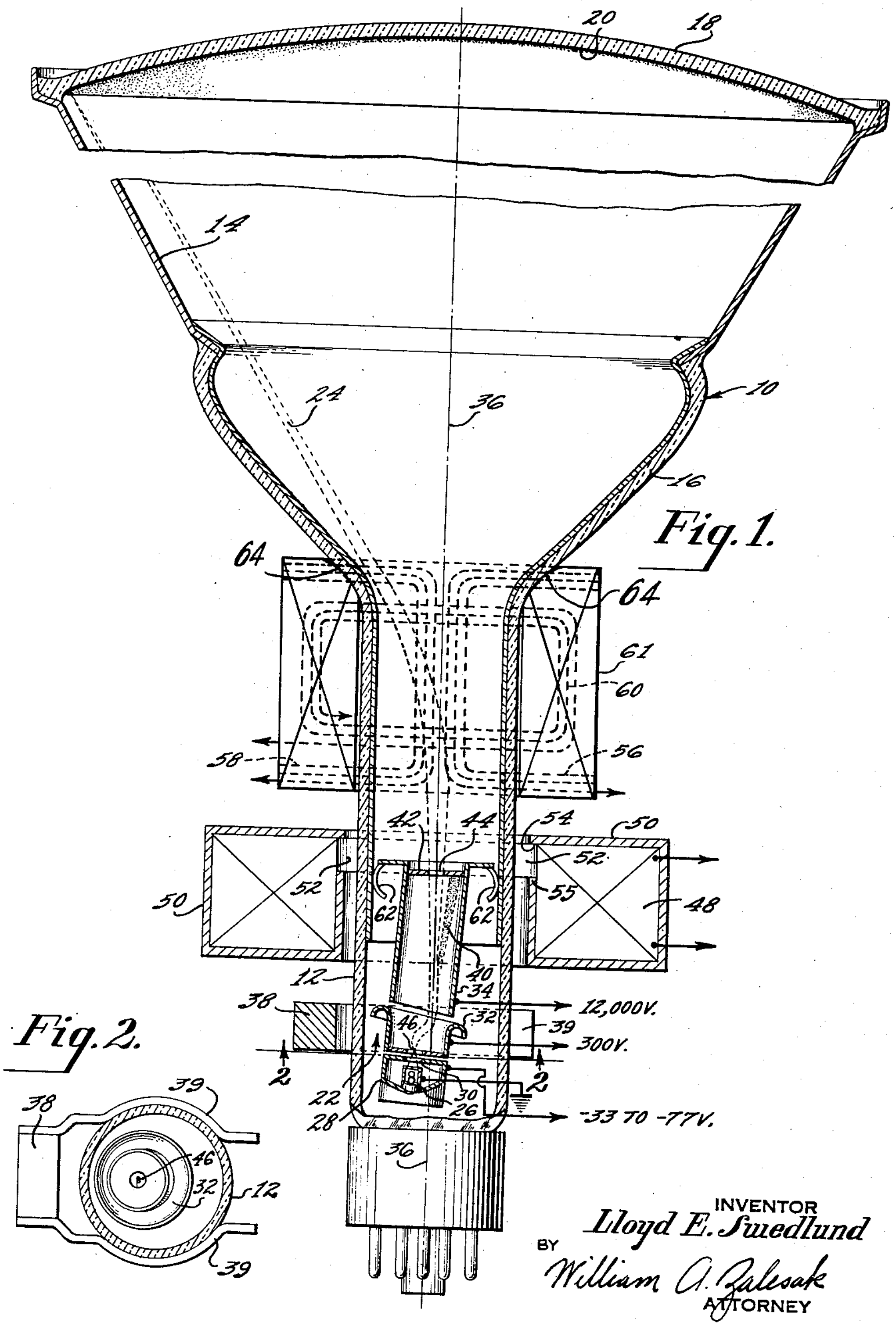
Figure 1 is a sectional view of a cathode ray tube having an improved structure in accordance with my invention.
Figure 2 is a cross sectional view of the tube of Figure 1 looking in the direction of arrows A—A.

Figure 1 discloses a cathode ray picture tube of a type which can be used for producing television pictures. The tube comprises essentially an envelope 10 formed with a neck portion 12 and a cone portion 14. The tube has a metal conical portion 14, which is sealed to a conical glass flare 16 extending at its smaller end into the glass neck portion 12. Closing the larger end of the metal cone portion 14 is a transparent glass face plate 18 on the inner surface of which is formed by any well known means a phosphor screen 20 adapted to provide luminescence when struck by an electron beam.

In forming envelope 10, portions 12, 16 and 14 are assembled or formed with a common axis 36 normal to face plate 18 at its center. Face plate 18 is normally spherical with its center of curvature on axis 36. Mounted within the neck portion 12 of the tube envelope is an electron gun structure 22 for providing a beam of electrons 24 directed toward the phosphor screen 20. Electron gun 22 comprises a conventional cathode structure consisting of a small metal cylinder 26 closed at the end facing the luminescent screen 20 with the closed end coated as is well known in the art, by an electron emissive coating (not shown). Coaxially surrounding cathode cylinder 26 is a control grid cylinder 28 having a small aperture 30 in an end wall portion thereof for the passage therethrough of the electrons from the cathode surface. Spaced longitudinally along the tube and coaxially mounted with respect to control grid 28 is a first accelerating electrode 32 consisting of a cup or thimble-like structure having an opening in its closed end wall portion. Also, mounted coaxially with grid 28 and accelerating electrode 32, is a second accelerating electrode 34 spaced along the tube axis toward the screen 20.

The electrons from the coated cathode surface are formed by the several electrodes of gun 22 into an electron beam, 24. Appropriate voltages are applied to the several electrodes of the gun structure, so that beam 24 will pass through accelerating electrode 34 at a high velocity and will strike fluorescent screen 20 to produce a luminescence. Figure 1 shows a set of voltages which have been applied to a successfully operated tube of the type shown. However, these voltages need not be limiting, as any other appropriate voltage relationship can be used for the respective electrodes of gun 22.

From Figure 1 it can be noted that the gun electrodes are coaxially mounted on an axis which is off-set but intercepts the axis 36 of the envelope. The purpose of this misalignment of gun parts is to provide means for trapping negative ions produced in the electron beam and preventing their striking and damaging the phosphor of the fluorescent screen 20. The electron beam formed by the gun 22 tends to pass down the common axis (not shown) of the electron gun parts. However, the adjacent ends of accelerating electrodes 32 and 34 are formed parallel to each other but at an angle to the axis of gun 22, so as to provide an asymmetric electrostatic field between these electrodes. This asymmetric field deflects the beam electrons and negative ions off of the axis of gun 22 so that they will intersect the tube axis 36. A magnetic field is formed by an ion trap magnet 38 having pole pieces 39 (Figure 2) arranged so that field of the magnet acts on the electrons of the beam 24 in an opposite direction than that of the asymmetric field. The magnetic ion trap field is adjusted so that as the beam crosses the tube axis 36, the electrons of the beam in this region are re-directed along the tube axis 36, while the ion component 40 of the beam, not be affected by this magnetic re-aligning field, will maintain its direction of displacement by the asymmetric field and will strike the wall structure of electrode 34 and an apertured disc or plate 42 closing the end of the tubular electrode. This specific arrangement of gun parts is more fully set forth in my copending application Serial No. 608,663 filed August 3, 1949.

At the end of the tubular accelerating electrode 34 facing the fluorescent screen 20 is mounted an apertured disc or wall member 42 having an aperture 44 therethrough. The apertured disc 42 blocks the ion component 40 of the beam. Beam 24 must be centered with aperture 44 to produce maximum screen brightness. As is well known, the electrons from the cathode 26 are brought to a first cross-over point 46 in the region of the accelerating electrode 32. The electrons passing through the cross-over point 46 are divergent. The field between electrodes 32 and 34 tends to converge the electrons of the beam somewhat and to partially focus them. However, the beam passing through aperture 44 is still divergent. A primary focusing field is provided by a focusing coil 48 for bringing the electrons of the beam to a well-defined focus point at the surface of the phosphor screen 20. Focusing coil 48 is of conventional form and comprises essentially of a wire coil mounted coaxially with the tubular neck portion 12. Coil 48 is enclosed by soft-iron annular housing 50 formed with an annular air gap 52 in its inner wall. Portions 54 and 55 of housing 50 are thus poles, between which is established an intense magnetic field, which fringes outwardly to form a focusing field at the tube axis 36.

In a magnetically focused and magnetically deflected cathode ray tube, if good focus, particularly at the edges of the screen, is desired, it is necessary that the electron beam pass through the focusing coil field perpendicular to and well centered with its air gap. In the tubes similar to that of Figure 1, it is recognized that only the center tenth of the focusing field of the focusing coil has low aberration. In Figure 1, the diameter of the tube neck in the region of air gap 52 is approximately 1.8 inches, then the portion of the field in this region with tolerable aberration is substantially 180 mils. The width of the electron beam passing through the limiting aperture 44 is substantially 120 mils, this being the diameter of opening 44. Thus, only a small deviation from the alignment of the beam with the center of the focusing field will produce a noticeable focus distortion.

To form a luminescent raster or television picture on the luminescent screen 20, beam 24 is scanned over the surface of screen 20 in any well known manner. One method is that shown in Figure 1 and comprises two pairs of deflection coils forming a neck yoke 61 surrounding tube neck 12. One pair of deflection coils 56 and 58 are connected in series and are mounted on opposite sides of the tube neck to provide a magnetic field transverse to the beam path 24 and the tube axis 36. A second pair of deflection coils, illustrated schematically by the coil 60, are mounted opposite to each other and positioned so that the field produced between them is also transversed to the beam path and the tube axis and perpendicular to the fields of coils 56 and 58. As is well known in the art, the coils of each pair are connected in series and respectively to sources of currents for providing line and frame scansion of the beam over the surface of the luminescent screen 20.

The deflection fields are generally not uniform, being weakened gradually away from the center in order to provide a rectangular raster on the screen. This is done as the screen radius of curvature is greater than the distance to the center of deflection, particularly in wide deflection angle tubes. Because the deflection field is not uniform, it is important that the electron beam be well centered in the deflecting fields. An off-center beam will produce raster shape distortion and more important additional deflection de-focusing at the edges of the raster. Additional complications are introduced in tubes of the type shown provided with an ion trap gun structure. The structure, for example, shown in Figure 1, discloses the electron gun 22 mounted off the tube axis 36. Formerly it has been the practice to place aperture 44 of the gun structure completely outside of the field of focusing coil 48 and preferably between the base of the tube and focusing coil 48.

In accordance with my invention I arrange the limiting aperture 44 within the region of the air gap 54 of focusing coil 48. By means of bulb spacers 62 it is possible to accurately position the end of the accelerating electrode 34 coaxial with the tubular envelope portion 12. The deflection coil 48 can be accurately mounted on the neck portion 12 so that it is coaxial to the neck. Furthermore, in accordance with my invention, the deflecting yoke 61 may also be accurately aligned with the envelope axis 36. This may be done by flaring the front end of the neck yoke 61 and as shown at 64. Envelope 10 is also rounded between the glass cone 16 and neck 12. Thus yoke 61 can be slipped forward until the flared portion 64 of yoke 61 fits snugly against cone 16. Other advantages are obtained with the design. The flared portion 64 of yoke 61 permits longer deflection coils which have greater deflection sensitivity. Also the flare portion 64 positions the deflection coils in contact with the glass of tube 12 and thus eliminates the only air gap between coils 56—60 and beam 24 in this region. These design factors contribute to greater deflection sensitivity.

In making the adjustments for operating the tube of Figure 1, the ion trap magnet 38 is rotated and simultaneously moved slightly forward and backward until a maximum beam brightness as indicated on the fluorescent screen 20 is obtained. At this point then there is a maximum beam current passing through the aperture 44. The electron beam passing through the aperture 44 is now automatically at the center of the focusing field of coil 48. And furthermore, if the beam is aligned with the axis 36, it will enter the center of the deflecting fields of yoke 61.

Customarily the spacing of the focusing coil 48 from deflecting yoke 61 is substantially about one-half inch. If the beam passes through aperture 44 at a slight angle to the tube axis 36 it will only be slightly out of alignment with the center of the deflecting coils. If necessary, correction can be obtained for this misalignment by moving the focusing fields slightly off center yet maintaining the plane of coil 48 substantially perpendicular to the tube axis 36. This slight adjustment will realign the beam path along the tube axis 36 so that the beam 24 will pass into the center of the deflecting fields.

The specific tube structure described is one then that provides an optimum focus of the electrons at all points of the fluorescent screen 20. Furthermore, by obtaining an accurate alignment of the electron beam with the center of the deflecting fields there results minimum distortion of the beam when it is scanned over the fluorescent screen surface. Also, the beam will not enter the deflecting field off-axis, which would result in a deflection defocusing of the beam at the fluorescent screen. Furthermore, since the beam is well centered relative to the deflecting fields in a tube using a wide deflection angle, there is less danger of the beam striking the edge of the neck close to a de-centered beam. The structure then provides an accurate alignment of the electron beam with both the deflecting fields and focusing fields of the gun with the advantages described.

While certain specific embodiments have been illustrated and described, it will be understood that various changes and modifications may be made therein without departing from the spirit and scope of the invention.

I claim:

1. An electron discharge device comprising, an electron gun including a source of electrons for producing an electron beam along a path, a target screen mounted transversely to said beam path, and a coil enclosing a part of said electron gun between said electron source and said target screen for producing a focusing field within said coil, said electron gun part including a beam limiting aperture positioned on the axis of said coil, said electron gun source being offset from said coil axis.

2. An electron discharge device comprising, an electron gun including a cathode electrode for producing a beam along a path, a target screen mounted transversely to said beam path, a coil enclosing a portion of said electron gun between said cathode electrode and said target screen for producing a field focusing said electron beam on said target screen, a pair of pole pieces enclosing the ends of said coil and longitudinally spaced along the coil axis by an air gap, said electron gun including a beam limiting aperture positioned on the axis of said coil and adjacent said spaced pole pieces, said gun cathode electrode being offset from said coil axis.

3. An electron discharge device comprising, an electron gun including a source of electrons for producing an electron beam along a path, a target screen mounted transversely to said beam path, a coil enclosing a part of said electron gun for producing a focussing field within said coil, said electron gun part including a beam limiting aperture positioned on the axis of said coil, and a deflecting yoke including a plurality of coils for providing scansion of said beam across said target, said yoke mounted coaxially with said focussing coil and between said focussing coil and said target screen, said electron gun source being offset from said coil axis.

4. An electron discharge device comprising, an envelope having a tubular neck portion, an electron gun including a cathode electrode mounted within said tubular neck portion for producing an electron beam, a target screen mounted transversely to the axis of said tubular neck portion, a coil coaxially mounted on said neck portion for producing a field focussing said electron beam substantially on the surface of said target, and a deflecting yoke including a plurality of coils for providing scansion of said electron beam across said target surface, said yoke mounted coaxially on said neck portion and between said neck portion and said target screen, said electron gun including a transverse plate portion having a beam limiting aperture positioned within said focussing coil and on the axis of said tubular neck portion, said gun cathode electrode being offset from said coil axis.

5. An electron discharge device comprising, an envelope having a tubular neck portion, an electron gun mounted within said tubular neck portion for producing an electron beam, a target screen mounted transversely to the axis of said tubular neck portion, a coil coaxially mounted on said neck portion for producing a field focussing said electron beam substantially on the surface of said target, a pair of pole pieces enclosing the ends of said coil and longitudinally spaced along the axis of said neck portion by an air gap, and a deflecting yoke including a plurality of coils for providing scansion of said electron beam across said target surface, said yoke mounted coaxially on said neck portion and between said neck portion and said target screen, said electron gun including a transverse plate portion having a beam limiting aperture positioned on the axis of said tubular neck portion within said focussing coil and adjacent said spaced pole pieces.

6. An electron discharge device comprising, an envelope having a tubular neck portion and a conical portion connected at its smaller end coaxially to said neck portion, an electron gun including a cathode electrode mounted within said neck portion for providing an electron beam, a target screen mounted transversely to the common axis of said tubular and conical envelope portions, and an annular deflecting yoke including a plurality of coils for providing scansion of said electron beam across the surface of said target, said yoke having a flared opening at one end thereof, said yoke mounted on said tubular envelope portion with said flared opening fitted in contact with the surface of the smaller end of said conical envelope portion whereby said yoke is maintained coaxial with said tubular envelope portion, said electron gun including a portion having a beam limiting aperture positioned on the axis of said tubular neck portion, said gun cathode electrode being offset from said coil axis.

7. An electron discharge device comprising, an envelope having a tubular neck portion and a conical portion connected at its smaller end coaxially to said neck portion, an electron gun mounted within said neck portion for providing an electron beam, a target screen mounted transversely to the common axis of said tubular and conical envelope portion, a coil coaxially mounted on said neck portion for producing a field focussing said electron beam substantially on one surface of said target, and an annular deflecting yoke including a plurality of coils for providing scansion of said electron beam across said target surface, said yoke having a flared opening at one end thereof, said yoke mounted on said tubular envelope portion with said flared opening fitted in contact with the surface of said smaller end of said conical envelope portion whereby said yoke is maintained coxial with said tubular envelope portion, said electron gun including a transverse plate portion having a beam limiting aperture positioned within said focussing coil and on the axis of said tubular neck portion.

8. An electron discharge device comprising, an envelope having a tubular neck portion and a conical portion connected at its smaller coaxial end to said neck portion, an electron gun including a cathode electrode mounted within said neck portion for providing an electron beam, a target screen mounted transversely to the common axis of said tubular and conical envelope portions, a coil coaxially mounted on said neck portion for producing a field focussing said electron beam substantially on the surface of said target, a pair of pole pieces enclosing the ends of said coil and longitudinally spaced along the axis of said tubular envelope portion by an air gap, and an annular deflecting yoke including a plurality of coils for providing scansion of said electron beam across said target surface, said yoke having a flared opening at one end thereof, said yoke mounted on said tubular envelope portion with said flared opening fitted in contact with the surface of said smaller end of said conical envelope portion whereby said yoke is maintained coaxial with said tubular envelope portion, said electron gun including a portion having a beam limiting aperture positioned on the axis of said tubular envelope portion and between said spaced pole pieces, said gun cathode electrode being offset from said coil axis.

References Cited in the file of this patent

UNITED STATES PATENTS

| Number | Name | Date |
|---|---|---|
| 1,941,157 | Smith | Dec. 26, 1933 |
| 2,155,514 | Tolson et al. | Apr. 25, 1939 |
| 2,186,393 | Ring et al | Jan. 9, 1940 |
| 2,240,700 | Kemp | May 6, 1941 |
| 2,250,622 | Bowie | July 29, 1941 |
| 2,274,586 | Branson | Feb. 24, 1942 |
| 2,460,609 | Torsch | Feb. 1, 1949 |
| 2,464,419 | Smith et al. | Mar. 15, 1949 |
| 2,570,425 | Bocciarelli | Oct. 9, 1951 |

FOREIGN PATENTS

| Number | Country | Date |
|---|---|---|
| 627,482 | Great Britain | Aug. 10, 1949 |